United States Patent [19]

Voss et al.

[11] 4,378,075

[45] Mar. 29, 1983

[54] APPARATUS FOR THE SIMULTANEOUS, METERED DISPENSING OF FILLERS AND HARDENER PASTES

[76] Inventors: Klaus-Wilhelm Voss, Theodor Storm Allee 48, 2082 Uetersen; Werner Kluj, Im Winkel, 2082 Heidgraben, both of Fed. Rep. of Germany

[21] Appl. No.: 235,056

[22] Filed: Feb. 17, 1981

[30] Foreign Application Priority Data

Jan. 15, 1981 [DE] Fed. Rep. of Germany ....... 8100807

[51] Int. Cl.³ .............................................. B67D 5/52
[52] U.S. Cl. .................................... 222/137; 222/485; 222/558
[58] Field of Search .......................... 83/580; 425/311; 222/136, 137, 142, 558, 485, 389

[56] References Cited

U.S. PATENT DOCUMENTS

| 1,287,023 | 12/1918 | Hornung | 222/558 X |
| 1,325,269 | 12/1919 | Stanley | 222/558 X |
| 2,366,654 | 1/1945 | Rotter et al. | 222/137 X |
| 4,108,335 | 8/1978 | Hoff et al. | 222/137 |
| 4,314,653 | 2/1982 | Sindoni | 222/137 X |

Primary Examiner—David A. Scherbel
Attorney, Agent, or Firm—Beveridge, DeGrandi & Kline

[57] ABSTRACT

The invention relates to an apparatus for the simultaneous, metered dispensing of fillers and hardener pastes, making it possible to draw off clean substances without encrusted filler particles or other contaminants and which reliably prevents any overdosing of the paste. The two containers for the filler and the paste are held in centered manner in the apparatus in the vicinity of a drawing-off and metering device by means of which the two substances are deposited in closely juxtaposed manner on a putty knife or the like. In addition, it is possible to match the hardener paste quantity required for the filler to the outside temperature conditions.

1 Claim, 4 Drawing Figures

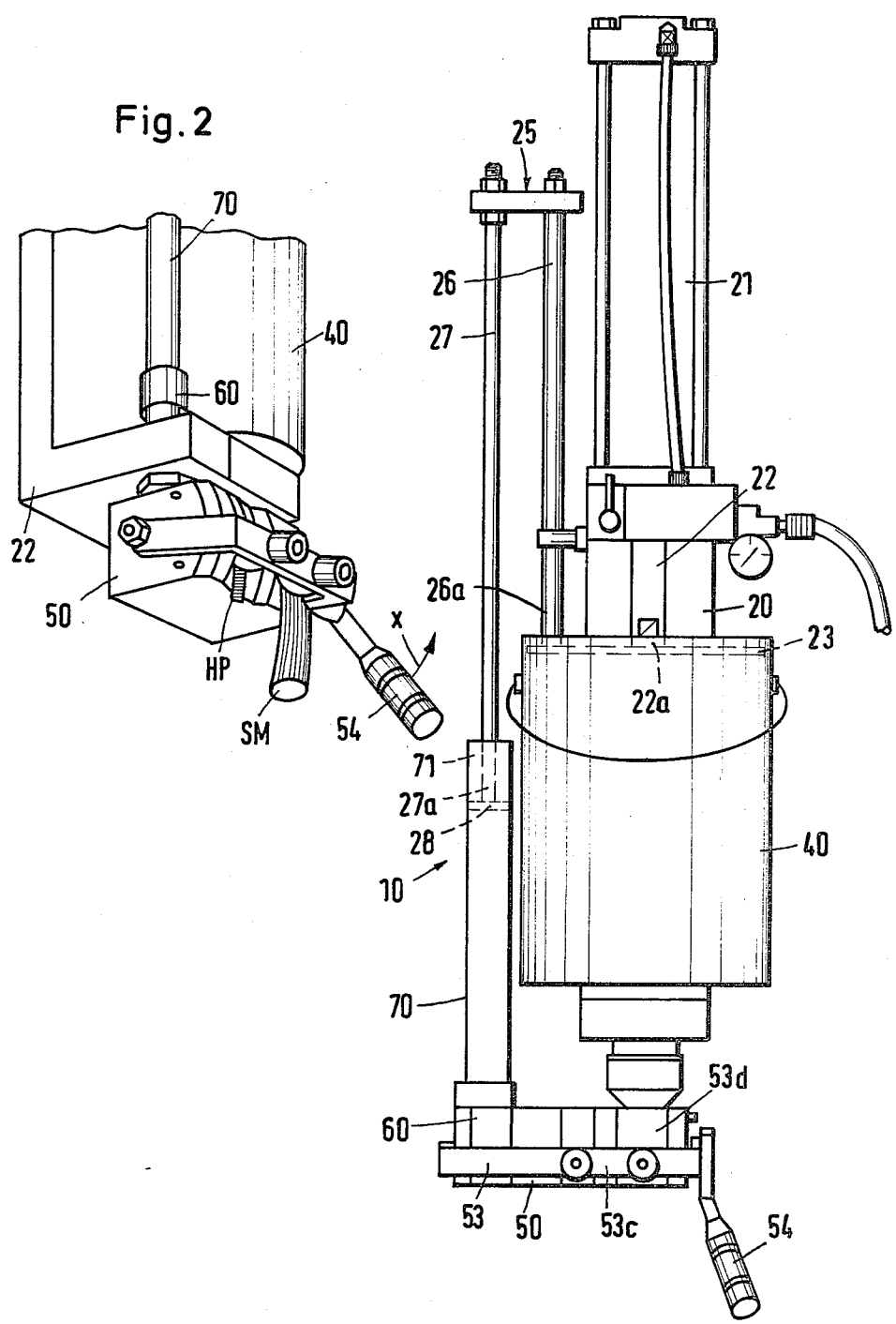

APPARATUS FOR THE SIMULTANEOUS, METERED DISPENSING OF FILLERS AND HARDENER PASTES

BACKGROUND OF THE INVENTION

The invention relates to an apparatus for the simultaneous, metered dispensing of fillers, particularly polyester fillers and hardener pastes.

It is often considered disadvantageous, particularly in the case of multikilogram containers, containing viscous substances, particularly fillers and cement or putty can seldom be completely emptied and even then this can only be achieved with a considerable working effort and additional implements, such as putty knives, etc. As there is a tendency to avoid this work, the container is thrown away still containing residual amounts of its original content. It is also difficult to handle the container content, due to the highly viscous consistency of the substance. Thus, such filler residues are lost and are not in fact available for use. It is also considered disadvantageous that the application of the filler and the hardener paste to a putty knife always takes place in such a way that it is subsequently necessary to mix the two substances. As the container discharge openings for the filler and for the hardener paste are generally far apart, part of the substances to be mixed can flow past the relatively small putty knife. Furthermore, when the container content is removed by introducing a putty knife into the interior thereof, the substance in the container is contaminated by hardened substance fragments adhering to the knife and which are detached within the container. In addition, the containers containing the fillers cannot be adequately covered again after use and are left unsealed overnight, particularly over weekends, leading to a direct loss of material, because the dried-in upper layer must firstly be removed when use is recommenced. Open containers also lead to contamination, because abrasive dust of different grain sizes can be deposited on the surface. Moreover, there is encrusting of the material on the edge of the container, so that once again valuable material is lost.

BRIEF SUMMARY OF THE INVENTION

The problem of the invention is therefore to provide an apparatus for the simultaneous, metered or dosed dispensing of fillers and hardener pastes, making it possible to draw off clean substances containing no encrusted filler particles or other contaminants and which prevents any overdosing of the hardener paste.

According to the invention this problem is solved by an apparatus for the simultaneous, metered dispensing of fillers, particularly polyester fillers, and hardener pastes, wherein (a) in the upper part of a supporting structure is provided a working cylinder operated by means of compressed air, pressurized gas, hydraulically, electromotively or manually having a vertically displaceable piston rod and with a piston plate provided on the end thereof;

(b) on the supporting structure in the movement area of the piston rod of the working cylinder is provided a centering plate for a filler container which receives the piston plate in the interior thereof and which is provided with a central or eccentric bore, whose upper all-round edge conically tapers towards the centre of the bore;

(c) below the centering plate there is an emptying or filling head having two delivery openings for the filler and the hardener paste closable by means of a blade-like closing member with a lever-type handle, which are closely juxtaposed and whereof the filler delivery opening is connected by means of a connecting piece with the bore in the centering plate, whilst the hardener paste delivery opening is connected via a bore in the filling head with an intake port constructed in the top thereof issuing into an interchange adapter which can be placed on the filling head with a mounting support for receiving the hardener paste cartridge, which is open at the bottom;

(d) the working cylinder piston plate is fixed to the free end of one leg of a U-shaped member, the free end of whose other leg carries a piston plate displaceable in the interior of the hardener paste cartridge;

(e) the connecting piece connecting the delivery opening for the filler in the filling head is guided into the conical area of the bore in the centering plate;

(f) the container is provided with a base portion having an all-round edge which overlaps the all-round edge of the centering plate, the diameter and shape of the base portion corresponding to that of the centering plate and having a discharge port formed in the base portion in accordance with the position of the bore in the centering plate, whilst corresponding to the latter and the all-round edge thereof corresponds to the conical shape of the bore and is drawn circularly inwards.

An apparatus constructed in this way ensures the simultaneous, metered drawing off of filler and hardener paste on to a putty knife or the like, the filler and hardener paste being dispensed in closely juxtaposed manner on to the knife, which is particularly advantageous for the following mixing of filler and paste. Using this apparatus it is possible to draw off completely satisfactory, clean substances, which do not contain encrusted filler particles or other contaminants which, as is known, is annoying to the painter and causes ridges to form when applying the material. Thus, it is possible to effortlessly draw off both large and small quantities with a percentagewise accurate dosing-in of hardener paste. Overdosing is prevented and consequently so is a possible bleeding through on to painted surfaces. It is particularly advantageous to use an interchange adapter for receiving the hardener paste cartridge. Thus, if in winter more hardener is required, the adapter and piston of the hardener push rod, as well as the hardener cartridge are merely replaced by larger diameter units, which are once again precisely matched to one another. The filling head used in the apparatus ensures a tight sealing of the delivery openings for the filler and the hardener paste after removal has taken place, thereby avoiding encrusting or hardening of residues thereof.

By means of an apparatus constructed according to the invention and its container for the filler and the hardener paste it is possible to completely empty the said container. The filler container is secured on the centering plate and is always arranged in such a way that its bottom discharge port corresponds with the bore in the centering plate, which is in turn connected with the delivery opening in the filling head. The special, matched constructions of the centering plate bore and the bottom discharge port in the container ensure a tight seal when the filler container is placed on the centering plate. The all-round edge of the filler container laterally overlaps the centering plate, so that a firm seat of the container in the apparatus is ensured. In addition, the apparatus is reusable. When such a container is emptied, a new, full container is placed in the apparatus and the container content can be dispensed in the in each case desired quantity by means of the working cylinder and the filling head. As the filler container construction is matched to that of the apparatus, it is only possible to use containers especially constructed for this purpose in the apparatus.

BRIEF DESCRIPTION OF THE DRAWINGS

The invention is described in greater detail hereinafter relative to non-limitative embodiments and with reference to the attached drawings, wherein show:

FIG. 1 a front view of the dispensing apparatus.

FIG. 2 the lower part of the dispensing apparatus with the filling head in a diagrammatic view.

DETAILED DESCRIPTION OF THE PREFERRED EMBODIMENTS

Figure 3:
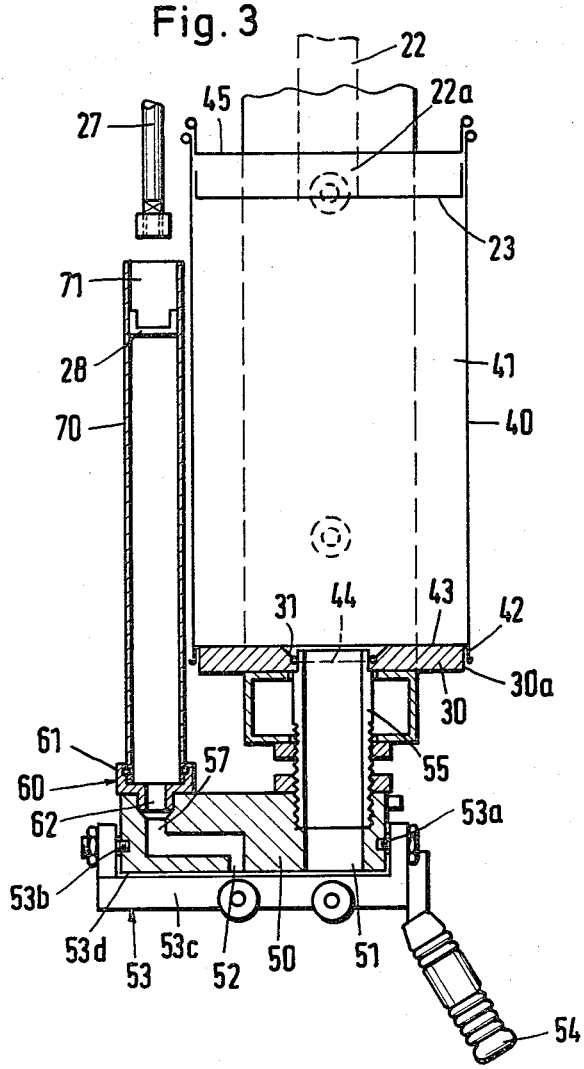
FIG. 3 the filling apparatus, partly in elevation and partly in vertical section.

The apparatus 10 for the simultaneous, metered dispensing of fillers, particularly polyester fillers, and hardener pastes, according to FIG. 1, comprises a supporting structure 20, equipped with fixing means for connection to a vertical wall or the like.

In the upper area of supporting structure 20 there is a working cylinder 21, constructed in per se known manner, operable by means of compressed air, pressurized gas, hydraulically, electromotively or manually. Working cylinder 21 is provided with a vertically displaceable piston rod 22, to whose end 22a is fixed a piston plate 23.

A centering plate 30 for a filler container 40 is provided in the lower part of supporting structure 20 in the movement area of piston rod 22 of working cylinder 21. Prior to placing in apparatus 10 container 40 is sealed by means of a cover 45. The bottom 43 of container 40 is provided with a discharge port 44, which is sealed by a closing plug or stopper (not shown in the drawings) for storing the container filled with filler.

Centering plate 30 is arranged in such a way with respect to cylinder 21 and its piston rod 22 that the container 40 placed on plate 30 can receive piston plate 23 of piston rod 22 of cylinder 21, so that plate 23 is longitudinally displaceable in the inner area 41 of container 40.

At the bottom container 40 is provided with an all-round edge 42 and has a cross-section and dimensions corresponding to those of centering plate 30, so that when container 40 is placed on plate 30 its all-round edge 42 overlaps the all-round edge 30a of plate 30, so that container 40 is reliably held on plate 30 (FIG. 3).

Figure 4:
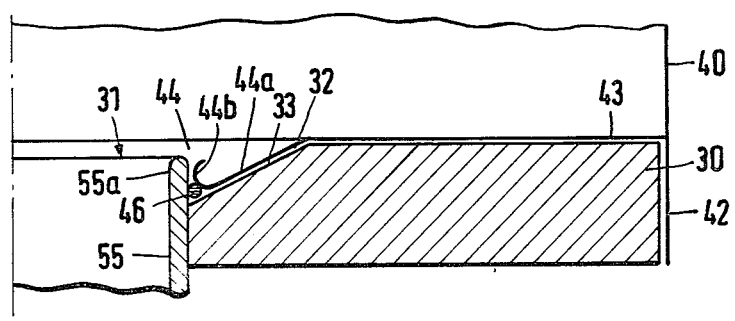
FIG. 4 the centering plate with mounted filler container in a vertical partial section.

Centering plate 30 is provided with a central bore 31, which can also be eccentrically positioned with respect to the centre of circular centering plate 30. The upper all-round edge 32 of bore 31 conically tapers towards the centre of the bore, as shown in FIG. 4. This conical portion is designated 33.

Below the centering plate 30 a filling head 50 is fixed to the latter or to the supporting structure 20 (FIGS. 2 and 3). Filling head 50 has two delivery openings 51, 52, whereof opening 51 is used for delivering filler and opening 52 for delivering hardener paste. The two delivery openings 51, 52 are closely juxtaposed.

The filler delivery opening 51 is connected to bore 31 in centering plate 30 by means of a connecting piece 55, whilst the hardener paste delivery opening 52 is connected by a bore 56 in filling head 50 with an intake port 57 formed at the top thereof.

The two delivery openings 51, 52 are jointly sealable by means of a U-shaped closing member 53 acting in blade-like manner and rotatably mounted at 53a and 53b on the sides of filling head 50 (FIG. 3). A handle 54, constructed as a one-armed lever is provided on one of the lateral legs of closing member 53. The surface of filling head 50 having the delivery openings 51, 52 is constructed in a circular manner, so that web 53c of closing member 53 runs on the circular surface 53d of filling head 50. On pivoting closing member 53 in the direction of arrow X by handle 54, the two delivery openings 51, 52 are simultaneously freed, so that filler and hardener paste can be delivered in juxtaposed manner from openings 51, 52. In FIG. 2 SM is a filler strand and HP a hardener paste strand. To ensure that when closing member 53 is closed no further filler or paste can flow out of delivery openings 51, 52, the latter are located in the vicinity of slot-like recesses provided in surface 53d of filling head 50 in which are movable sealing members arranged on the inside of web 53c of closing member 53, on operating the latter. As a result of this construction a very good sealing of delivery openings 51, 52 in the closed position of closing member 53 is ensured, so that no further filler or hardener paste can flow out of these openings. The operation of the thus constructed closing member corresponds to that of a blade-like cutting device, i.e. the filler and paste strands flowing out of the openings 51, 52 are correctly sheared or cut off on closing said openings.

In the vicinity of the hardener paste intake port 57 on filling head 50 is provided an interchange adapter 60, being detachably connected to said head. The adapter is provided with a mounting support 61 for receiving a cartridge 70 for the hardener paste. When in use cartridge 70 is open at the bottom. Cartridge 70 is provided with a removable bottom for storing paste-filled cartridges. When cartridge 70 is not in use the top portion thereof is sealed by a cover, not shown in the drawings. The cover is removed when the cartridge 70 is mounted on adapter 60. Adapter 60 is also provided with a connecting opening indicated at 62, which corresponds to the upper intake port 57 of the filling head, so that the content of cartridge 70 mounted on adapter 60 can be supplied via opening 62 and intake port 57 to bore 56 and consequently the delivery opening 52 in head 50.

The dimensions of interchange adapter 60 are adapted to the particular cartridge 70 used, so that it is possible to mount on filling head 50 cartridges with different diameters by using in each case a correspondingly constructed adapter 60. The use of adapter 60 is advantageous because at different outside temperatures to which apparatus 10 is exposed, different quantities of hardener paste must be supplied to the filler. More hardener paste is required for colder outside temperatures, so that larger diameter hardener paste cartridges must be used for the corresponding dosing of paste to the filler. Thus, at the same time as discharging the filler the in each case desired and necessary large hardener paste quantity is supplied, because the forcing out of filler and paste from the corresponding containers into filling head 50 for a simultaneous, metered removal takes place simultaneously by means of working cylinder 51, further details thereof being given hereinafter.

The pressing of hardener paste out of cartridge 70 mounted on filling head 50 into the latter takes place together with the pressing out of filler from container 40 by means of working cylinder 21. To this end piston plate 23 of piston rod 22 of working cylinder 21 is arranged on the free end 26a of leg 26 of a U-shaped control member 25, the free end 27a of its other leg 27 carrying a piston plate 28, which is longitudinally displaceable in the inner area 71 of cartridge 70. The construction and arrangement of the U-shaped member 25 are such that leg 27 with piston plate 28 is movably centrally and in the longitudinal direction of cartridge 70. Piston plate 28 need not be fixed to leg 27 of member 25. In the embodiment of FIG. 3 the free end 27a of leg 27 of member 25 is merely reinforced, whilst piston plate 28 is arranged in inner area 71 of cartridge 70 and is displaceable in the longitudinal direction of the latter. Piston plate 28 in the inner area 71 of cartridge 70 is constructed in such a way that plate 28 cannot tilt during the advance. If cartridge 70 is filled with hardener paste, then the piston plate 28 used can simultaneously form the upper closure for cartridge 70. The use of a piston plate 28 which is not connected to member 25 has the advantage that it is effortlessly possible to use cartridges 70 with different diameters, because the free end 27a of leg 27 of member 25 need only act on the piston plate already provided on the cartridge side if piston rod 22 is moved downwards by means of working cylinder 21. Member 25 is forcibly controlled together with piston rod 22, i.e. when rod 22 moves downwards member 25 is also moved downwards, so that the materials from container 40 and cartridge 70 are simultaneously pressed into filling head 50 and can be removed therefrom.

The connecting piece 55 connecting the filler delivery opening 51 in filling head 50 is guided into the conical area 33 of bore 31 in centering plate 30, so that connecting piece 55 with its upper all-round portion 55a projects into bore 31 (FIG. 4). The discharge port 44 in the bottom 43 of container 40 is constructed in such a way that after mounting container 40 on centering plate 30 a tight connection is established between connecting piece 55 and discharge port 44 in bottom 43 of container 40. The discharge port 44 in bottom 43 of container 40 is constructed in accordance with the position of bore 31 in centering plate 30 and is arranged in such a way that when container 40 is placed on centering plate 30 its discharge port 44 corresponds with the bore 31 in centering plate 30. If bore 31 in plate 30 is arranged eccentrically with respect to the centre of the plate, then the discharge port in bottom 43 of container 40 is correspondingly eccentrically arranged, so that in the mounted state the container discharge port 44 faces bore 31 in centering plate 30 (FIG. 3).

The all-round edge portion 44a of bottom 43 bounding the discharge port 44 is constructed in accordance with the shape of the conical portion 33 of bore 31 in centering plate 30 and is also conical, so that the edge portion 44a of bottom 43 runs parallel to the conical portion 33 of bore 31 (FIG. 4). The free all-round terminal edge of the conical all-round edge portion 44a passes into a circular, upwardly bent edge portion 44b, so constructed and arranged in the vicinity of the discharge port that when container 40 is mounted on centering plate 30 upper edge portion 55a of connecting piece 55 acts on the circular, downwardly bent edge portion 44b in the vicinity of discharge port 44 in such a way that there is a tight connection between the edge bounding port 44 and connecting piece 55. This connection is further improved if the edge bounding port 44 is made from an elastic, resilient material or if bottom 43 is made from such a material, so that then the all-round edge 44a bounding discharge port 44 is subject to a certain prestress. A better seal can also be obtained if, as shown in FIG. 4, a packing ring 46 is used, which externally surrounds connecting piece 55 in the vicinity of its upper portion 55a and when container 40 is mounted on plate 30 is subject to the action of the all-round edge 44a of discharge port 44.

Container 40 is so constructed that it is securely held on centering plate 30, as shown in FIGS. 3 and 4. The piston plate 23 fixed to piston rod 22 corresponds as regards shape and size to container 40, so that said container can be completely emptied.

The simultaneous discharge of filler and hardener paste by means of this apparatus takes place in such a way that after connecting in working cylinder 21, e.g. by supplying compressed air, by a corresponding actuation of the closing member 53 the in each case desired filler and paste quantities can be drawn off. As cylinder 21 simultaneously operates both piston plates 23 and 28, there is a simultaneous pressing out of substances from containers 40 and 70, so that on opening closing member 53 filler and paste can flow out of the delivery openings 51, 52 in filling head 50. As the two delivery openings 51, 52 of filling head 50 are closely juxtaposed, the drawn off quantity of filler and the simultaneously drawn off quantity of paste are placed so close together on e.g. a putty knife held under delivery openings 51, 52 that an intimate mixing of the two substances is possible. Unlike in the hitherto conventional methods for the purpose of mixing the two components they are not located a long way apart.

Piston plate 23 need also not be fixed to the piston rod 22. It is possible from the outset to arrange piston plate 23 in the interior of container 40, so that is is only for the pressing-out process that it is subject to the action of piston rod 22 of working cylinder 21. In place of a single adapter 60 two and more adapters can be provided for receiving on filling head 50 cartridges 70 having different diameters. The adapters are then e.g. combined in a sliding support, displaceably mounted on filling head 50 in such a way that connecting opening 62 of each adapter 60 is movable into the vicinity of intake port 57.

What is claimed is:

1. An apparatus for the simultaneous, metered dispensing of fillers, particularly polyester fillers, and hardener pastes, comprising:
    (a) a supporting structure having an upper part including a working cylinder with a vertically displaceable piston rod having a piston plate on the end thereof;
    (b) a centering plate mounted on said supporting structure and adapted for holding a filler container in a position to receive said piston plate in the interior of the filler container, the filler container having a base portion with a circumferential edge and a discharge port, said centering plate having a bore the upper circumferential edge of which conically tapers towards the centre of said bore, said centering plate further having a diameter and shape corresponding to the diameter and shape of the filler container base portion and being adapted to be overlapped by the circumferential edge of the filler container base portion;

(c) an emptying or filling head positioned below said centering plate and having two delivery openings for the filler and the hardener paste, said head including a blade-like closing member with a lever-type handle for closing said two delivery openings, a connecting piece connecting said filler delivery opening with the conical taper of said bore in said centering plate, and an intake bore connected to said hardener paste delivery opening, an interchange adapter adapted to be positioned on said filling head in communication with said hardener paste intake bore for receiving the hardener paste cartridge;

(d) a U-shaped member having said working cylinder piston plate fixed to the free end of one leg thereof and a second piston plate carried on the free end of the other leg thereof and displaceable in the interior of the hardener paste cartridge.

* * * * *